P. C. MORRIS.
FAN BELT GUIDE FOR FORD AND OTHER CARS.
APPLICATION FILED APR. 17, 1919.
1,339,408. Patented May 11, 1920.
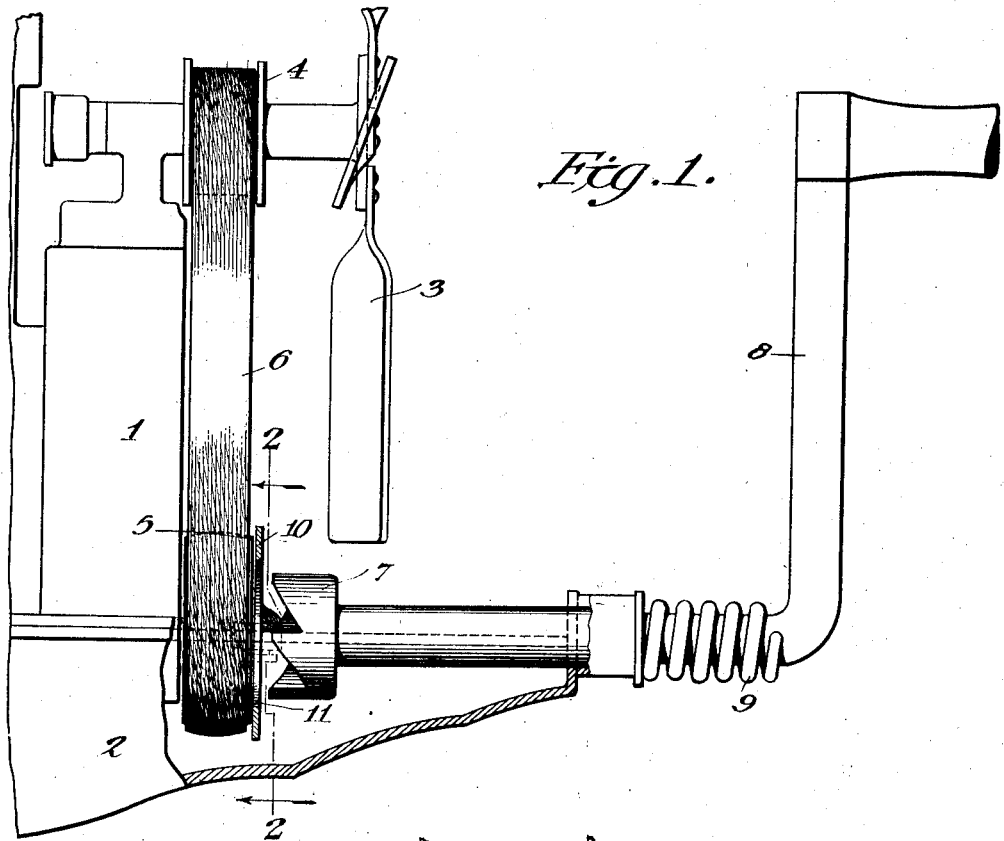
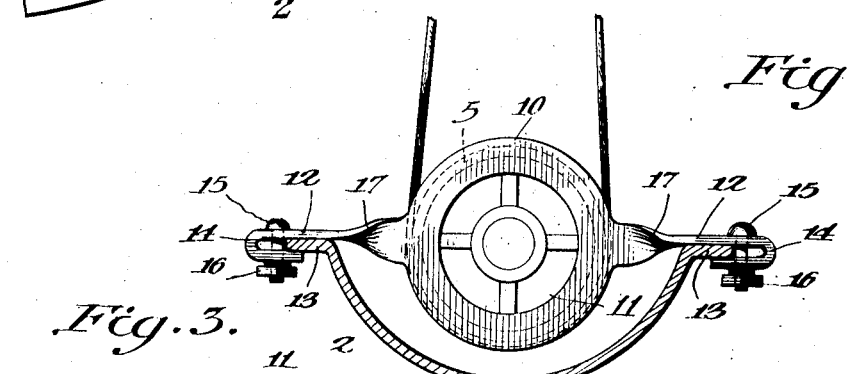
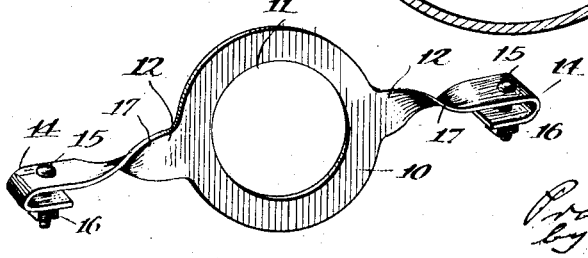

UNITED STATES PATENT OFFICE.

PRATT C. MORRIS, OF THOMASVILLE, GEORGIA, ASSIGNOR TO CHARLES W. COOPER, OF THOMASVILLE, GEORGIA.

FAN-BELT GUIDE FOR FORD AND OTHER CARS.

1,339,408.

Specification of Letters Patent.

Patented May 11, 1920.

Application filed April 17, 1919. Serial No. 290,827.

*To all whom it may concern:*

Be it known that I, PRATT C. MORRIS, a citizen of the United States, residing at Thomasville, in the county of Thomas and State of Georgia, have invented certain new and useful Improvements in Fan-Belt Guides for Ford and other Cars; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to a belt guide for pulleys, and is particularly designed for guiding the belt of driving pulleys, more especially the belt of pulleys used in driving the fan employed for cooling the engine and other parts of an automobile, for a more specific designation the fan of a Ford car. The object of the invention is to provide a guide of simple construction which can be readily applied without requiring change in the construction of the parts now in use and which will prove efficient in guiding the belt so that it will be prevented from slipping off the pulley around which it passes.

To the accomplishment of the foregoing and such other objects as may hereinafter appear the invention consists in the features hereinafter particularly described and then sought to be clearly defined by the claims, reference being had to the accompanying drawing forming a part hereof, and in which—

Figure 1 is a side view of the forward portion of a Ford car, showing a portion of the engine casing and crank case, and showing the belt guide applied to the lower belt pulley of the fan;

Fig. 2 is a cross-section on the line 2—2 of Fig. 1, showing the guide applied in front of the lower pulley of the fan belt, and the manner of attaching it to the crank case;

Fig. 3 is a perspective of the guide, detached.

In the drawing the numeral 1 designates a portion of the engine casing; 2 the crank-case; 3 the fan; 4 and 5 the belt pulleys; 6 the belt; 7 the starting crank-ratchet; 8 the starting crank; and 9 the crank spring, all as ordinarily used in a Ford car. Unless some form of belt guide is used, it frequently happens that the belt 6 will work wholly or partially off the lower pulley and impair or stop the proper working of the fan. To prevent this being done I provide a guide consisting of a flange 10 formed with an opening 11 for the passage of the crank-ratchet and supported at one side of the lower pulley 5 by means of laterally extending arms 12 which will be attached to the side flanges 13 of the forward portion of the crank case, for instance, by bent ends or clamps 14 which will clasp or embrace the side flanges, and may be securely held thereto by bolts 15 and securing nuts 16, the laterally extending arms being preferably bent or shaped from a vertical to a horizontal plane as illustrated at 17 so as to rest squarely upon the side flanges. The guide thus applied provides a stationary flange at one side of the pulley which will prevent the belt from slipping off the pulley and will guide it in its movement so that the efficiency of the fan is maintained at all times. The guide is relatively inexpensive to make, and is readily applied, and when necessary detached, without the exercise of skill or experience, and can be applied without any change in the ordinary construction of parts or the necessity of additional parts for its attachment.

For convenience of illustration I have shown the guide applied to a fan such as ordinarily installed in a Ford car or automobile, but it can be applied for the same purpose elsewhere or in other constructions where it admits of similar installation. The preferred details of the guide have been described with particularity but it is obvious that changes may be made therein without departure from the principal features of the guide.

Having described my invention and set forth its merits what I claim is:

1. A belt-guide comprising a flange to fit parallel with the side face of a pulley and formed with an opening adapted for the passage of a crank-ratchet and having a laterally extending arm for attachment to a support to sustain the flange in operative relation to the pulley.

2. A belt-guide comprising a flange to fit parallel with the side face of a pulley and formed with an opening adapted for the passage of a crank-ratchet, and arms extending laterally from the flange for sustaining the flange in operative relation to a pulley.

3. A belt-guide comprising an apertured flange for the passage of a crank-ratchet and provided with oppositely extending supporting arms for sustaining the flange parallel with the side-face of a pulley.

4. A belt-guide comprising an apertured flange for the passage of a crank-ratchet and provided with laterally extending arms for sustaining the flange parallel with the face of a pulley and having clamps for attachment to a support.

5. A belt-guide comprising an apertured flange for the passage of a crank-ratchet and provided with laterally extending arms for sustaining the flange parallel with the side-face of a pulley, said arms having portions standing at an angle to each other and formed with attaching clamps.

In testimony whereof I affix my signature in presence of two witnesses.

PRATT C. MORRIS.

Witnesses:
C. H. THOMSON,
W. J. MACDONALD.